(12) United States Patent
Kumar (10) Patent No.: US 9,369,774 B2
(45) Date of Patent: *Jun. 14, 2016

(54) SYSTEM AND METHOD FOR CONTROLLING HOME NETWORK DEVICES USING MULTICAST ENABLED REMOTE CONTROLS

(75) Inventor: Murari Kumar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/650,638

(22) Filed: Dec. 31, 2009

(65) Prior Publication Data

US 2011/0103285 A1 May 5, 2011

Related U.S. Application Data

(63) Continuation of application No. 11/298,046, filed on Dec. 8, 2005, now Pat. No. 7,843,865.

(51) Int. Cl.
*H04H 20/71* (2008.01)
*H04N 7/18* (2006.01)
*H04N 21/6405* (2011.01)
*H04N 21/422* (2011.01)
*H04N 21/4223* (2011.01)
*H04N 21/436* (2011.01)
*H04N 21/475* (2011.01)

(52) U.S. Cl.
CPC ....... *H04N 21/6405* (2013.01); *H04N 21/4223* (2013.01); *H04N 21/42204* (2013.01); *H04N 21/43615* (2013.01); *H04N 21/4755* (2013.01)

(58) Field of Classification Search
CPC .................. H04N 21/43615; H04N 21/43622; H04W 4/06
USPC .................. 455/418–420, 41.1–41.3; 709/219
See application file for complete search history.

(56) References Cited

U.S. PATENT DOCUMENTS

| 7,292,859 | B2 | 11/2007 | Park |
| 7,843,865 | B2 | 11/2010 | Kumar |
| 8,042,048 | B2 | 10/2011 | Wilson et al. |
| 8,489,748 | B2 * | 7/2013 | Kaarela ................. H04L 12/282 370/230 |

(Continued)

OTHER PUBLICATIONS

Office Action received for U.S. Appl. No. 12/650,636, mailed on Oct. 9, 2012, 19 pages.

(Continued)

*Primary Examiner* — Khawar Iqbal
(74) *Attorney, Agent, or Firm* — Barnes & Thornburg LLP (57) ABSTRACT

A system, method, and article of manufacture for controlling home network devices using a multicast enabled remote control. The system includes a plurality of home network devices capable of receiving and/or transmitting multicast input and/or output signals and a home gateway to receive audio/video signals generated outside of the home and to transform the audio/video signals into multicast output signals. The system also includes a multicast enabled remote control to detect, aggregate, store and display all audio/video multicast output signals on the multicast enabled remote control, to enable a user to redirect an audio/video multicast output signal to one or more of the plurality of home network devices capable of receiving multicast input signals, and to control the plurality of home network devices capable of receiving and/or transmitting multicast input and/or output signals. Other embodiments may be described and claimed.

15 Claims, 7 Drawing Sheets

(56) References Cited

U.S. PATENT DOCUMENTS

| | | | |
|---|---|---|---|
| 8,868,699 B2* | 10/2014 | Palm | H04L 41/0806 709/219 |
| 2003/0058827 A1* | 3/2003 | Chow | H04L 12/66 370/338 |
| 2003/0188320 A1* | 10/2003 | Shing | 725/131 |
| 2004/0117845 A1* | 6/2004 | Karaoguz | G08B 13/19658 725/134 |
| 2004/0184431 A1 | 9/2004 | Park | |
| 2004/0204086 A1 | 10/2004 | Choi et al. | |
| 2005/0002639 A1 | 1/2005 | Putterman et al. | |
| 2005/0002640 A1 | 1/2005 | Putterman et al. | |
| 2005/0005300 A1 | 1/2005 | Putterman et al. | |
| 2005/0076304 A1 | 4/2005 | Shing | |
| 2006/0025132 A1* | 2/2006 | Karaoguz et al. | 455/433 |
| 2006/0190627 A1 | 8/2006 | Wu et al. | |
| 2006/0200845 A1* | 9/2006 | Foster | G08B 13/1966 725/81 |
| 2006/0258289 A1* | 11/2006 | Dua | 455/41.3 |
| 2007/0004436 A1* | 1/2007 | Stirbu | 455/503 |
| 2007/0043829 A1 | 2/2007 | Dua | |
| 2007/0093199 A1* | 4/2007 | Bowen et al. | 455/3.02 |
| 2007/0136768 A1 | 6/2007 | Kumar | |
| 2007/0220024 A1 | 9/2007 | Putterman et al. | |
| 2010/0062724 A1* | 3/2010 | Fok | H04M 3/2236 455/67.11 |
| 2010/0100637 A1* | 4/2010 | Bowra | G06F 9/50 709/231 |
| 2010/0172283 A1* | 7/2010 | Karaoguz et al. | 370/312 |
| 2010/0220188 A1* | 9/2010 | Renkis | G08B 13/19619 348/143 |
| 2011/0026436 A1* | 2/2011 | Karaoguz | H04L 12/2803 370/254 |
| 2011/0085486 A1 | 4/2011 | Huang et al. | |
| 2011/0093903 A1 | 4/2011 | Huang et al. | |
| 2013/0282883 A1* | 10/2013 | Palm | H04L 63/20 709/222 |
| 2014/0111319 A1* | 4/2014 | Karaoguz | H04L 12/2803 340/12.22 |
| 2014/0208354 A1* | 7/2014 | Karaoguz | H04L 12/2803 725/40 |
| 2015/0017914 A1* | 1/2015 | Dua | G06F 17/30058 455/41.1 |

OTHER PUBLICATIONS

Office Action received for U.S. Appl. No. 12/650,641, mailed on Nov. 30, 2012, 27 pages.

Office Action received for U.S. Appl. No. 11/298,046, mailed on Oct. 5, 2009, 5 pages.

Office Action received for U.S. Appl. No. 11/298,046, mailed on Nov. 6, 2008, 8 pages.

Office Action Received for U.S. Appl. No. 12/650,636, mailed on Feb. 28, 2013, 15 pages.

Office Action received for U.S. Appl. No. 12/650,641, mailed on Sep. 25, 2013, 18 pages.

Advisory Action received for U.S. Appl. No. 12/650,641, mailed on Mar. 12, 2014, 4 pages.

Office Action received for U.S. Appl. No. 12/650,636, mailed on Feb. 26, 2014, 44 pages.

* cited by examiner

| 504 DATA | 506 DEVICE |
|---|---|
| 1. 230.0.0.1 Phone audio & video | a. Kitchen Headphone |
| 2. 230.0.0.2 Entrance camera-1 | b. Kitchen Speaker |
| 3. 230.0.0.3 Child room camera-2 | c. Child Room Speaker |
| 4. 230.0.0.4 Rear Entrance camera-3 | d. Living Room Television |
| 5. 230.0.0.5 Master Bedroom DVD-1 | e. Entrance Camera Speaker |
| 6. 230.0.0.6 Child PC-1 | f. Living Room Surr. Sound |
| 7. 230.0.0.7 Office MP3 | g. Living Room Headphone |
| 8. 230.0.0.8 Office PC-2 | h. Kitchen LCD |
| 9. 230.0.0.9 Living Room CD | i. Child Room LCD |
| 10. 230.0.0.10 Living Room DVD-2 | j. Dining Room Headphone |
| 11. 230.0.0.11 Master Bedroom PC-3 | k. Dining Room Speaker |
| 12. 230.0.0.12 Microphone | l. Master Bedroom Television |
| 13. 230.0.0.13 Kitchen PC-4 | m. Master Bedroom Speaker |
| 14. 230.0.0.14 Cable Ch. 2 | n. Master Bedroom DVD |
| 15. 230.0.0.15 Cable Ch. 3 | o. Master Bedroom Headphone |
| 16. 230.0.0.16 Cable Ch. 4 | p. Bathroom Speaker |
| 17. 230.0.0.17 Cable Ch. 5 | q. Bathroom Headphone |
| 18. 230.0.0.18 Cable Ch. 6 | r. Home Office Headphone |
| 19. 230.0.0.19 Cable Ch. 7 | s. Home Office Printer |
| 20. 230.0.0.20 Cable Ch. 8 | ... |
| 21. 230.0.0.21 Cable Ch. 9 | |
| ... | |

FIG. 6 understand the intricate workings of each of the digital devices. What is also needed is a system and method for enabling the consumer to use any digital device anywhere within the home without having to re-wire the device when the device is used in a different location of the home.

SYSTEM AND METHOD FOR CONTROLLING HOME NETWORK DEVICES USING MULTICAST ENABLED REMOTE CONTROLS

CROSS-REFERENCE TO RELATED APPLICATION

This application is a Continuation Application to U.S. patent application Ser. No. 11/298,046, entitled "A System And Method For Controlling Home Network Devices Using Multicast Enabled Remote Controls," filed on 8 Dec. 2005 by Murari Kumar, assigned to a common assignee, the entire subject matter which is herein incorporated by reference.

BACKGROUND OF THE INVENTION

1. Field of the Invention

The present invention is generally related to digital home networking. More particularly, the present invention is related to a system and method for controlling home network devices using a multicast enabled remote control.

2. Description

The evolution of digital technological advances over the last decade or so is transforming the average house into a digital home. For example, homes now include digital equipment that enable users of the home to watch television and surf the Internet at the same time on the same digital device, to view their digital photographs on the television or on the computer, to network personal computers within the home to enable the sharing of documents, images and other types of media amongst the networked PCs, etc.

Each digital device usually comes with its own remote control. A problem associated with having so many different digital devices in the home is having to keep track of each of the remote controls. The ability to control all of the different digital devices in the home is often times difficult for the average consumer. Connecting all of the digital devices in the home may also pose a problem for the average consumer. Also, having to re-wire/re-connect a digital device when the digital device is to be used in a different location of the home may be an inconvenience. For example, if one wants to view a digital video disc (DVD) in the family room when the only DVD player is connected to the television in the living room, the DVD player must be disconnected from the television in the living room and re-connected to a television in the family room. Also, if one wants to view vacation or special family event camcorder movies, the camcorder has to be connected to a television or some other type of display in a room of the house. If the person is showing the camcorder movie(s) to guests, the camcorder may have to be connected to the television in the living room or the family room. If the person is viewing the camcorder movie(s) alone or with another family member, the person may want to view the camcorder movie(s) in the comfort of his/her bedroom, and therefore, must connect the camcorder to the television in his/her bedroom. Also, if the person wants to download the camcorder movies to his/her computer, the camcorder has to be connected to the computer. Thus, the connection and re-connection of the camcorder to different display devices depending on its use within the home can be burdensome to any consumer.

Thus, what is needed is a system and method for enabling the consumer to use multiple digital devices within the home without putting an undue burden on the user to fully understand the intricate workings of each of the digital devices. What is also needed is a system and method for enabling the consumer to use any digital device anywhere within the home without having to re-wire the device when the device is used in a different location of the home.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearance of the phrases "in one embodiment" or "in an embodiment" appearing in various places throughout the specification are not necessarily all referring to the same embodiment.

Embodiments of the present invention are directed to a system and method for controlling home network devices. Embodiments of the present invention provide a very easy and cost effective way to control an entire range of digital home devices (audio/video devices as well as non-audio/video devices) using a single multicast enabled remote control. The home network transmits multicast signals using local multicast assigned addresses for each multicast channel in the network. All network devices are given a friendly name and a fixed local multicast address during device setup time. The multicast enabled remote control allows the home user to detect available audio/video multicast streams and redirect an input network device to receive a selected multicast stream. The multicast enabled remote control also allows the home user to control the full range of home network devices.

Embodiments of the present invention reduce the complexity of controlling all of the home network devices and eliminate the requirement of having multiple remote control devices to control separate devices in the home. Multicasting all of the digital network devices using a single remote control enable audio and/or video output devices to be played in any room within the home that has a digital network input device, regardless of the location of the audio and/or audio/video output device. The multicast enabled remote control detects available I/O (input/output) devices and multicast audio/video streams. A user, via the multicast enabled remote control, may select a multicast address/channel and redirect the multicast address/channel to be played on a network input device by selecting the desired input device. For example, live video from an entrance way surveillance camera can be redirected to an LCD (liquid crystal display) display in the kitchen if a user is located in the kitchen and wants to view any activity at the entrance way of the home. Digital photos stored on a computer may also be redirected to the LCD in the kitchen for viewing by a user located in the kitchen. In yet another example, a movie being played on a subscriber cable channel may be redirected to the LCD in the kitchen for viewing by the user located in the kitchen. Thus, the LCD display may be converted into a video monitor, a digital photo frame, or a television depending upon what type of audio/video transmission is desired for viewing by the user. Users of the system in other locations of the home having a display may also view any of the above items simultaneously or at different times. A user of the system may control any of the network devices (e.g., surveillance camera, computer, cable television channel, and LCD) via the multicast enabled remote control as well.

Although embodiments of the present invention are described as having certain digital network I/O devices in a digital home, the invention is not limited to the digital network I/O devices described. One skilled in the relevant art(s) would know that more, less, or other digital network I/O devices may be used in a digital home network without departing from the scope of the invention.

Figure 1:
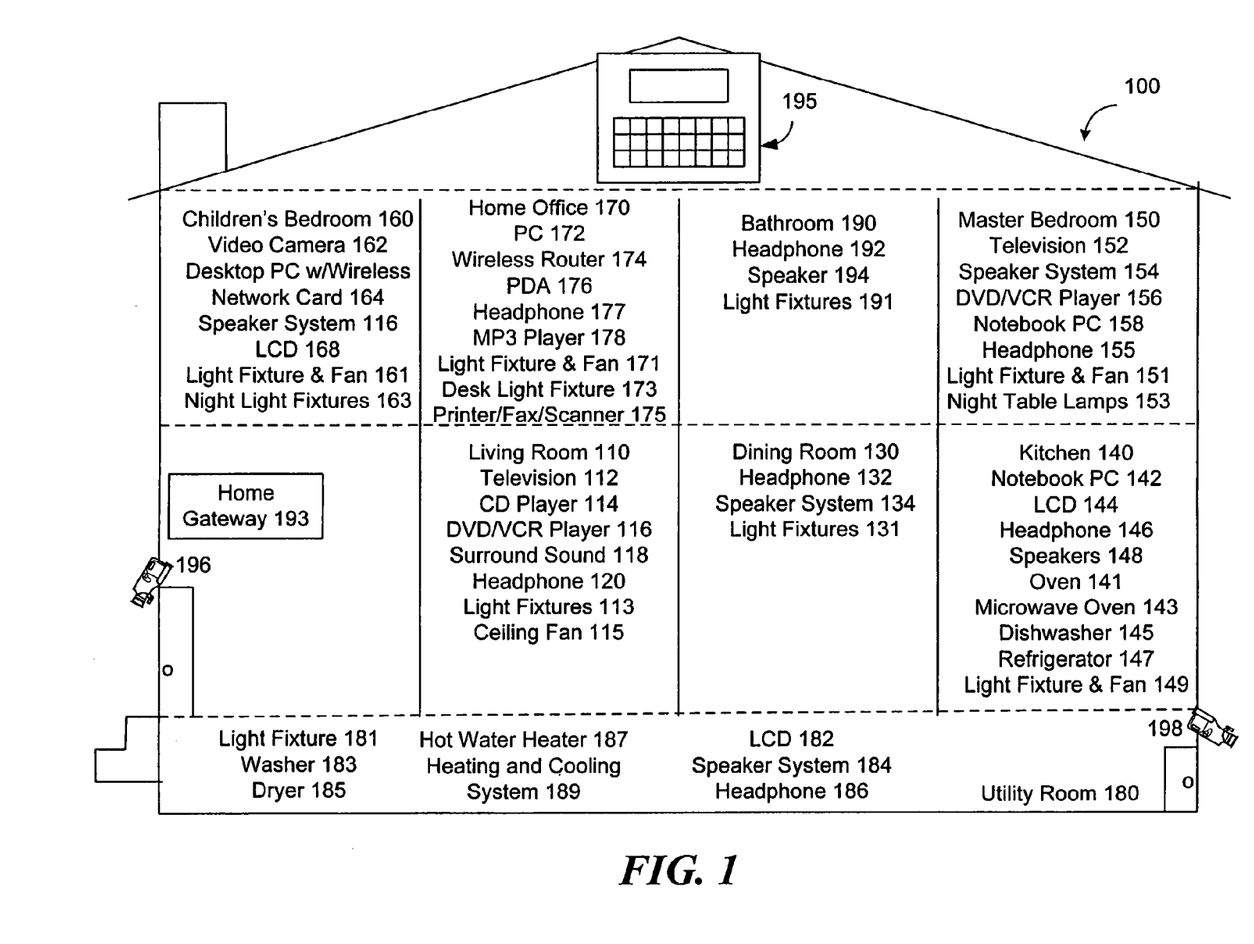
FIG. 1 is a block diagram illustrating an exemplary system 100 of a digital home network having a multicast enabled remote control according to an embodiment of the present invention.

FIG. 1 is a block diagram illustrating an exemplary system 100 of a digital home network having a multicast enabled remote control according to an embodiment of the present invention. Although system 100 shows a finite number of digital network devices, more digital network devices, less digital network devices, or other digital network devices may be employed in a digital home network using the single multicast enabled remote control.

As shown in FIG. 1, system 100 includes a plurality of audio/video digital devices and non-audio/video digital devices interspersed throughout a home, as well as outside the home. Rooms within a home may include, but are not limited to, a living room 110, a dining room 130, a kitchen 140, a master bedroom 150, a child's bedroom 160, a home office 170, a utility room 180, and at least one bathroom 190.

Living room 110 may comprise audio/video digital devices such as, but not limited to, an entertainment center having a television 112, a CD (compact disc) player 114, a combination DVD/VCR (digital video disc/video cassette recorder) player and/or digital video recorder 116, and a surround sound audio system 118. Living room 110 may also include a headphone 120 to enable a user to receive telephone calls, music, intercom communications, or other audio multicast signals from the network. Non-audio/video digital devices may include, but are not limited to, light fixtures 113 to light living room 110 and a ceiling fan 115 to cool living room 110.

Dining room 130 may include, but is not limited to, a headphone 132 to enable a user to receive telephone calls, music, intercom communications, or other audio multicast signals from the network and a speaker system 134 to enable audio signals to be piped in for all to listen. Dining room 130 may comprise non-audio/video digital devices, such as, but not limited to, and light fixtures 131 to light dining room 130.

Kitchen 140 may include audio/video digital network devices such as, but not limited to, a notebook PC 142, an LCD display 144, a headphone 146, and speakers 148. Non-audio/video network devices may include, but are not limited to, a conventional oven 141, a microwave oven 143, a dishwasher 145, a refrigerator 147, and a combination light fixture and fan 149.

Master bedroom 150 may comprise audio/video digital network devices such as, but not limited to, a television 152, a speaker system 154, a combination DVD/VCR player 156, a notebook personal computer (PC) 158, and a headphone 155. Non-audio/video network devices found in master bedroom 150 may include, but are not limited to, a combination light fixture and fan 151 and night table lamps 153.

Child's bedroom 160 may comprise audio/video digital network devices such as, but not limited to, a video camera 162 for viewing child activity, a desktop PC with a wireless network card 164, a speaker system 166, and a LCD (liquid crystal display) 168. Non-audio/video digital network devices may include, but are not limited to, a combination light fixture and fan 161 and night light fixtures 163.

A home office 170 may include audio/video digital network devices such as, but not limited to, a notebook or desktop PC 172 with a wireless router 174, a personal digital assistant (PDA) 176, a headphone 177, and an MP3 (MPEG (Moving Picture Experts Group)-1 Audio Layer-3) player 178. Headphone 177 may receive calls for an office telephone number or home telephone number. Non-audio/video digital network devices in home office 170 may include, but are not limited to, a combination ceiling light fixture and fan 171, a desk light fixture 173, and a printer/fax/scanner 175.

Utility room 180 may include audio/video network devices such as, but not limited to, an LCD 182, a speaker system 184, and a headphone 186. Non-audio/video digital network devices may include, but are not limited to, a light fixture 181, a washer 183, a dryer 185, a hot water heater 187, and a heating/cooling system 189.

Bathroom 190 may include audio/video digital network devices, such as, but not limited to, a headset 192 and a speaker 194. Non audio/video digital network devices may include, but are not limited to, light fixtures 191.

In one or more entrance ways to the home, system 100 may also include security surveillance cameras 196/198 for viewing activity occurring at each entrance into the home. Although not explicitly shown in FIG. 1, the entrance hallway may also include one or more non audio/video digital devices such as, for example, one or more light fixtures and a speaker system.

Just inside the home, for example, in an entrance hallway, system 100 may include a home gateway 193 for accepting all electrical signals generated by outside sources, such as, for example, service providers. Such signals may include, but are not limited to, telephone signals, television signals, digital cable signals, satellite cable signals, etc. Home gateway 193 accepts the incoming signals and separates the signals into local multicast addresses/channels. For example, each cable or satellite channel will be provided a multicast address/channel. Home gateway 193 may also be capable of sending audio/video signals via telephone communications as well.

One or more multicast enabled remote control devices 195 are also included in system 100. In one embodiment, each room (110, 130, 140, 150, 160, 170, 180, and 190) of the house may include multicast enabled remote control 195 dedicated for use in that particular room. In another embodiment, only the major rooms in the house include multicast enabled remote control 195. In yet another embodiment, system 100 may include one multicast enabled remote control device 195 for each person living in the home, excluding small children and infants.

The digital home devices shown in FIG. 1 may be connected via a wireless network using such techniques as WiFi (Wireless Fidelity), WiMAX (Worldwide Interoperability for Microwave Access), Bluetooth, or any other wireless technique (presently known or to be developed in the future) that enables the digital home devices within the home to functionally operate without wires. WiFi, WiMAX, and Bluetooth are well known wireless techniques to those skilled in the relevant art(s).

Embodiments of the present invention separate the digital home devices into three (3) types. The first type comprises home devices that are non audio/video devices. The second type comprises audio and/or video output devices that are capable of multicasting the audio and/or video on local multicast addresses. The third type of digital home devices include audio and/or video input devices that are capable of playing the audio and/or video streams that are generated by the devices of the second type, that is, audio and/or video output devices.

Figure 2:
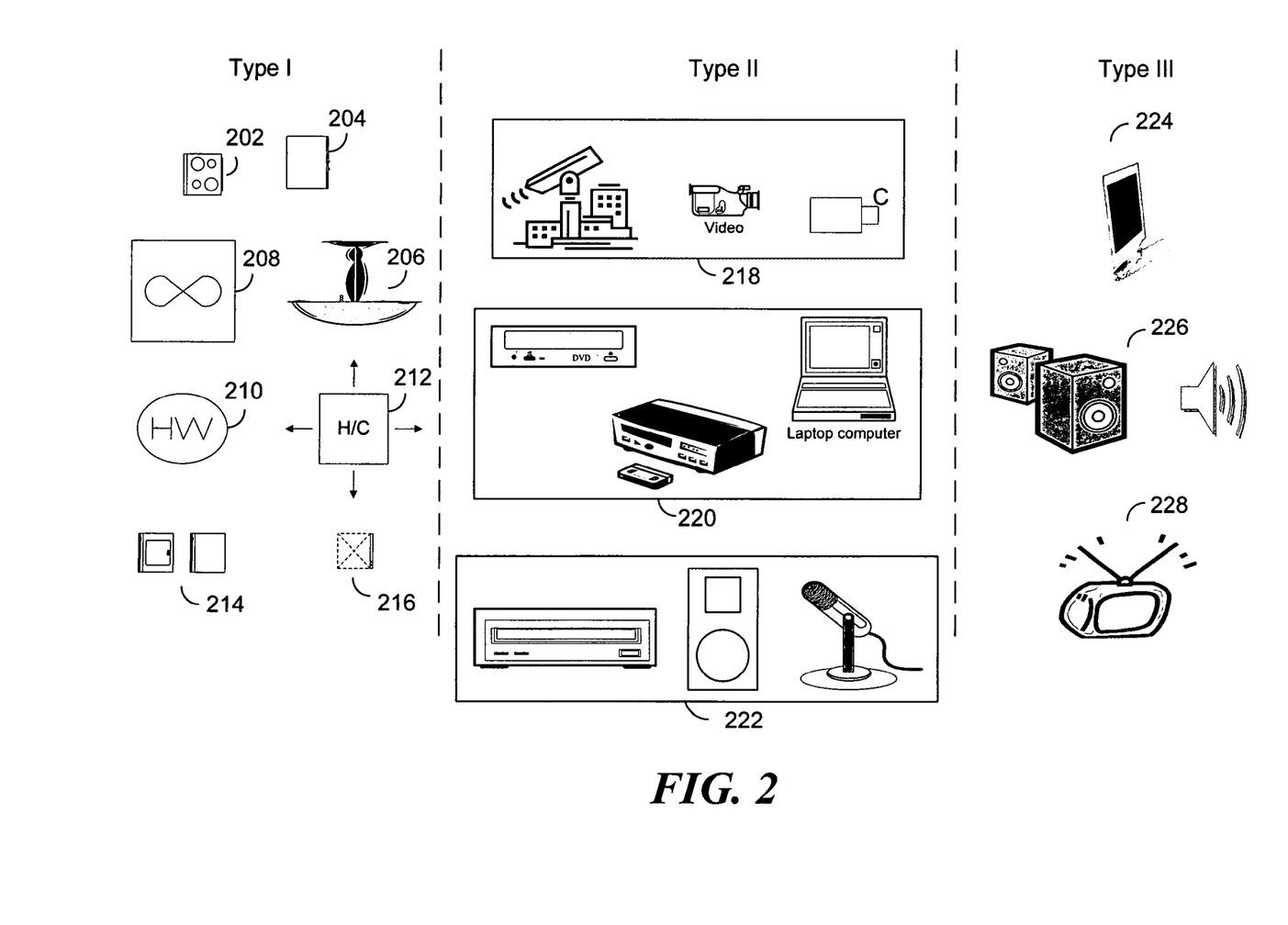
FIG. 2 is a diagram illustrating examples of three different types of digital home devices according to an embodiment of the present invention.

FIG. 2 is a diagram illustrating examples of the three types of digital home devices according to an embodiment of the present invention. As shown in FIG. 2, Type I digital network devices are non audio/video devices. These devices include the normal home appliances, such as, but not limited to, ovens 202 such as microwave, gas, electric, or convection ovens; refrigerators 204; lights 206; fans 208, hot water heaters 210, heating and cooling systems 212, washer/dryer 214, dishwasher 216, etc. In one embodiment, the lights of a home may be broken into zones and controlled according to zones. In alternative embodiments, the lights of a home may be controlled according to rooms or groups of rooms. In embodiments of the present invention, multicast enabled remote control 195 will be used to control the digital network devices of Type I.

As indicated above, Type II digital network devices comprise audio and/or video digital network output devices that are capable of multicasting the audio and/or video output on a local multicast address. The exemplary digital network output devices shown in FIG. 2 include, but are not limited to, digital cameras 218 for providing video or video and audio, such as, but not limited to, a surveillance camera system, a camcorder, and a digital camera; audio devices 220, such as a compact disc (CD) player, an MP3 player, a digital cassette player, a digital radio, a microphone, and other types of digital devices that provide audio for one's listening enjoyment; and audio/video digital devices 222, such as, for example, a digital video disc (DVD) player, a digital video recorder (DVR), a camcorder, a personal computer, a personal digital assistant, and other types of digital network devices that enable audio and/or video output multicasting on a multicast address.

As previously stated, Type III digital network devices include audio and/or video digital network input devices that are capable of playing the streams of audio and/or video streams generated by the digital network devices of Type II. Such devices, may include, but are not limited to, speakers 224, displays 226, televisions 228, and any other type of audio and/or video devices that enable the rendering of audio and/or video streams generated by the devices of Type II for one's viewing and/or listening pleasure.

In embodiments of the present invention, all network connected devices are multicast capable. They may be capable of receiving multicast streams (e.g., LCD displays, televisions, refrigerators, microwaves, etc.) and/or sending multicast streams (e.g., DVD player, computer, etc.) in a local multicast network environment. During setup of a digital network device, an administrator/home owner assigns the device a user friendly name and a fixed local multicast address to detect and control the device. For example, a DVD player in the living room and a DVD player in the master bedroom may be given the user friendly names of "Living Room DVD" and "Master Bedroom DVD" and the multicast addresses of "230.0.0.11" and "230.0.0.15", respectively. All audio/video and non audio/video devices record their presence to multicast enabled remote control 195 by multicasting their identity on their assigned address. The audio/video home network devices broadcast their presence using the fixed multicast address assigned during setup.

Figure 3:
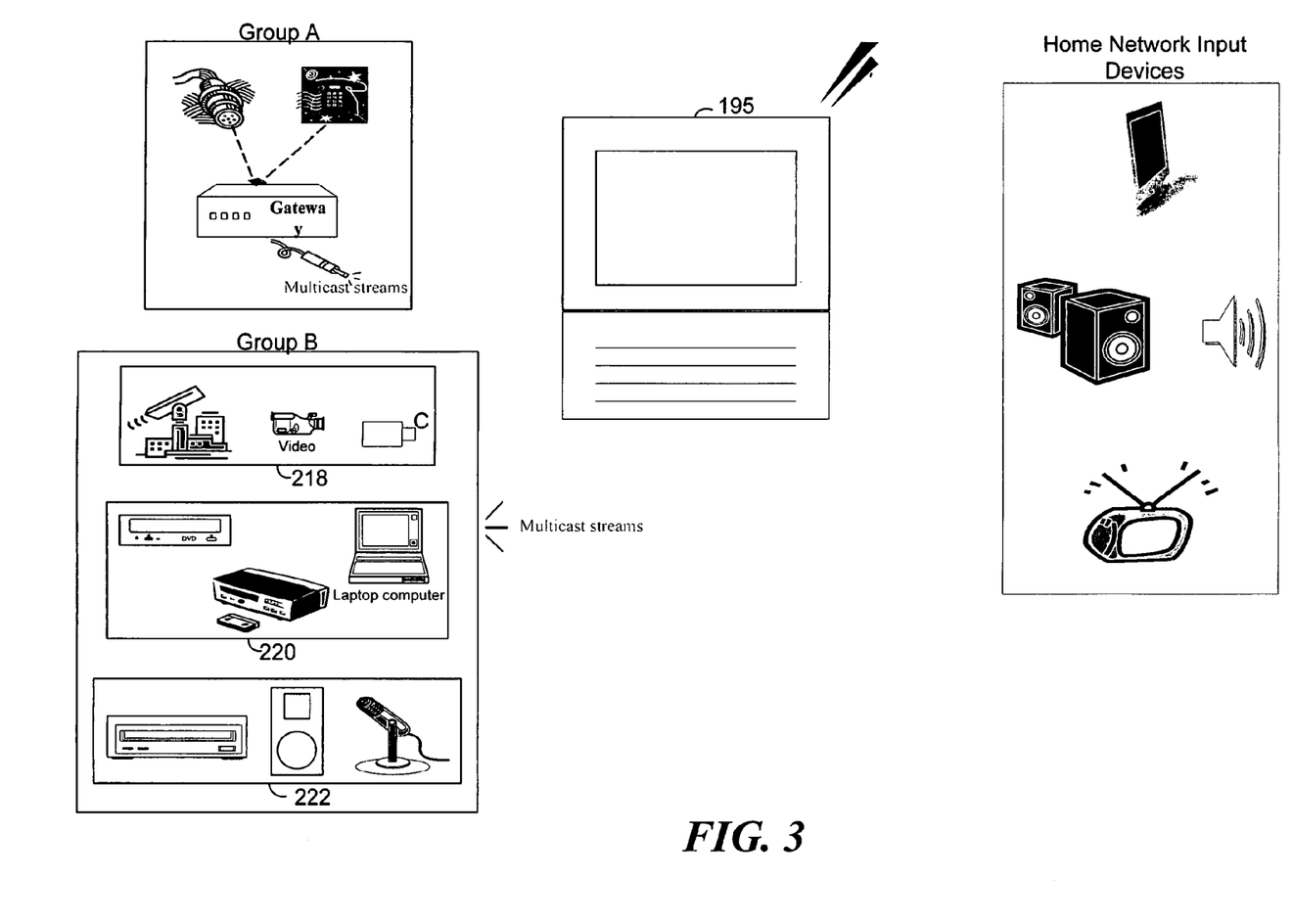
FIG. 3 illustrates audio/video signals utilized by a digital home network according to an embodiment of the present invention.

As previously indicated, signals for the digital home network may be received from an outside source, such as, for example, a service provider, or within the home from either audio/video digital home devices or non-audio/video digital home devices. FIG. 3 illustrates the audio/video signals utilized by the digital home network according to an embodiment of the present invention. FIG. 3 shows audio/video signals transmitted into the home from outside sources (Group A signals), audio/video signals transmitted within the home via the audio/video digital multicast devices within the home (Group B signals), and multicast enabled remote control 195.

Group A signals are audio/video signals that are transmitted into the home from outside sources. Group A signals may include, but are not limited to, telephone signals 302, television signals 304 (including high definition television (HDTV), cable television signals, satellite television signals), and digital radio signals 306. Signals that are received from outside sources are captured by home gateway 193. Home gateway 193 accepts incoming signals and places them on a local multicast address/channel. For example, a local multicast address may be assigned to each cable or satellite channel, telephone number, and radio station being received by home gateway 193.

Group B signals are audio/video multicast signals that are generated by the digital multicast devices within the home. Group B signals may be generated from digital camcorders, digital surveillance cameras, digital video disc (DVD) players, entertainment centers, compact disc players, MP3 players, or any other digital device that generates audio/video multicast signals. As previously indicated, each device that generates a group B signal is provided a multicast address and a name upon setup of the device.

The audio/video multicast signals from home gateway 193 (Group A) and from each digital device in the home capable of generating multicast audio/video signals (Group B) are detected by multicast enabled remote control 195. Multicast enabled remote control 195 may distribute the multicast transmissions on a home input device upon the request of a user. Such home input devices include displays (such as plasma displays, LCD displays, etc.), televisions, stereo speakers, loudspeakers, intercoms, headphones, and any other network input device that accepts audio and/or video multicast streams.

Figure 4:
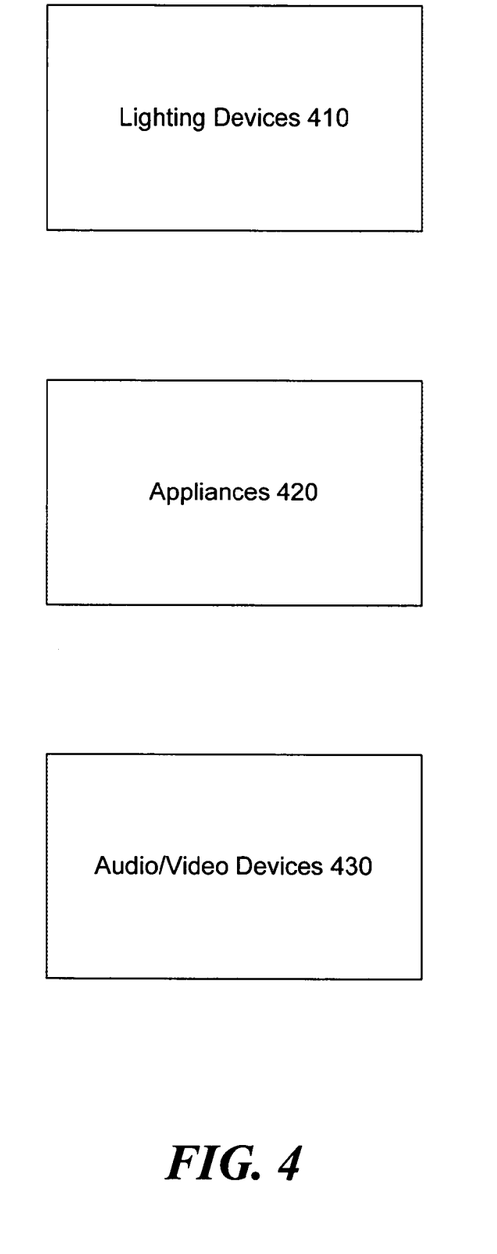
FIG. 4 illustrates exemplary digital devices that are controlled by a multicast enabled remote control according to an embodiment of the present invention.

Digital devices within the home may also be controlled by multicast enabled remote control 195. FIG. 4 illustrates exemplary digital devices that are controlled by multicast enabled remote control 195 according to an embodiment of the present invention. Although FIG. 4 illustrates specific digital devices, the invention is not limited to the digital devices illustrated. One skilled in the relevant art(s) would know that other digital devices capable of receiving multicast signals may also be used. The devices shown in FIG. 4 comprise household lighting devices 410, home appliances 420, and audio/video devices 430 that may be controlled by multicast enabled remote control 195. Household lighting devices 410 include light fixtures such as, but not limited to, ceiling lights, wall lights, and lamps. Home appliances 420 include ovens, such as, but not limited to, conventional ovens, microwave ovens, convection ovens, etc., dishwashers, refrigerators, washers, dryers, heating and cooling systems, hot water heaters, etc. Audio/video devices 430 include DVD/VCR players, CD players, MP3 players, speaker systems, headphones, cameras, camcorders, displays, televisions, etc.

Figure 5A:
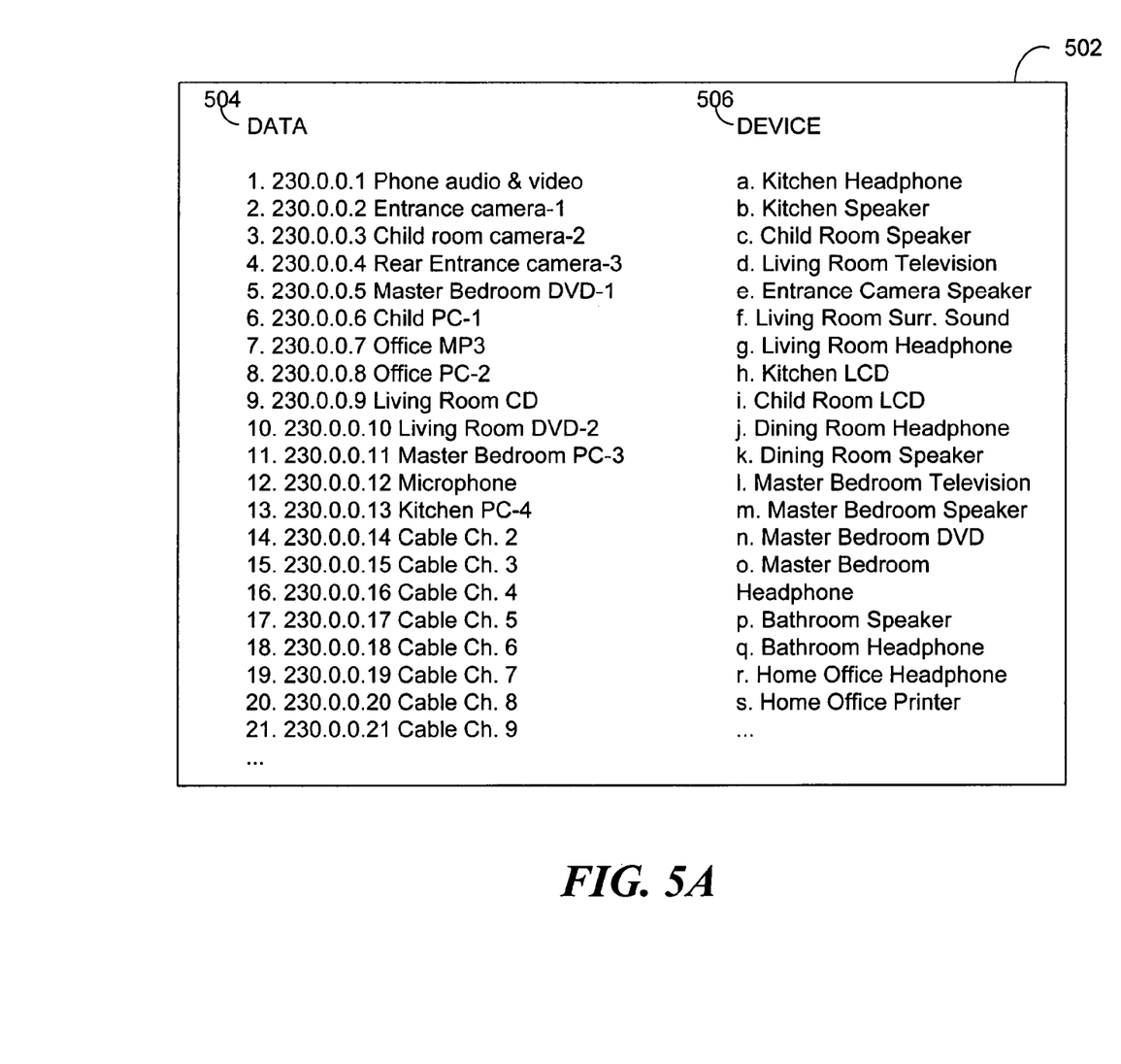
FIG. 5A illustrates an exemplary multicast enabled remote control according to an embodiment of the present invention.

FIG. 5A illustrates an exemplary multicast enabled remote control 195 according to an embodiment of the present invention. Although not explicitly shown, remote control 195 includes a plurality of ports. For example, the distribution of audio/video multicast streams operates on one port, such as, for example, port 0, and the control of digital multicast devices in the home operates on another port, such as, for example, port 1. Multicast enabled remote control 195 includes a display 502 and a plurality of keys 508 for distributing audio/video throughout the home and controlling the multicast devices within the home. Display 502, as illustrated in FIG. 5A, shows the operation of multicast enabled remote control 195 in the redirection mode (port 0 position). Display 502 shows a data list 504 and an input network device list 506. In one embodiment, data list 504 provides a list of multicast addresses for audio/video streams from digital network output devices in an ordered number fashion that may be distributed throughout the home. Device list 506 provides a list of the possible multicast input devices in an alphabet sequence in which the audio/video multicast streams from data list 504 may be rendered on throughout the home. In other embodiments of the invention, other ordering schemes may be used to identify items on the data list and device list. For example, items on the data list may be identified by letters and items on the device list may be identified by numbers.

To distribute audio/video throughout the home, a user must select an item from data list 504 and at least one item from input device list 506. For example, to monitor the entrance way surveillance camera on multicast stream no. 2 (multicast address 230.0.0.2) using the kitchen-LCD, a user must select multicast stream no. 2 from data list 504 and multicast device h from device list 506. To verbally communicate with a person at the entrance way, the user must redirect the microphone (from the surveillance camera) on multicast stream no. 12 (multicast address 230.0.0.12) from data list 504 to the kitchen speaker on device b from input device list 506. To watch a movie being played on the master bedroom DVD in the living room, the user must select multicast stream no. 5 (multicast address 230.0.0.5) from data list 504 and multicast device d (Living Room television) from input device list 506.

Embodiments of the present invention do not limit the listening and/or viewing of an audio/video stream to one network input device. In fact, multiple network input devices may play the same audio/video stream simultaneously. For example, a movie being played on the living DVD player may be viewed on one or more of the television in the living room, the television in the master bedroom, the LCD in the children's room, the LCD in the kitchen, and/or the LCD in the utility room.

In embodiments of the present invention, telephone signals may be rendered on speaker systems as well as headphones throughout the home. In one embodiment, telephone signals may always be connected to at least one headphone in the home or to one or more headphones in the home so that telephone calls may be picked up immediately without having to be redirected to a specific headphone each time a telephone call is received. Telephone signals are also sent to an outside source via home gateway 193. In some embodiments, telephone signals may also include video signals that may be displayed on any television or LCD throughout the home. In an embodiment in which home gateway 193 may also send video signals, video signals may also be sent to an outside party using a camera (not shown) attached to a headphone or any other camera within the home if the user so desires by selecting the camera and home gateway 193 on multicast enabled remote control 195.

Figure 5B:
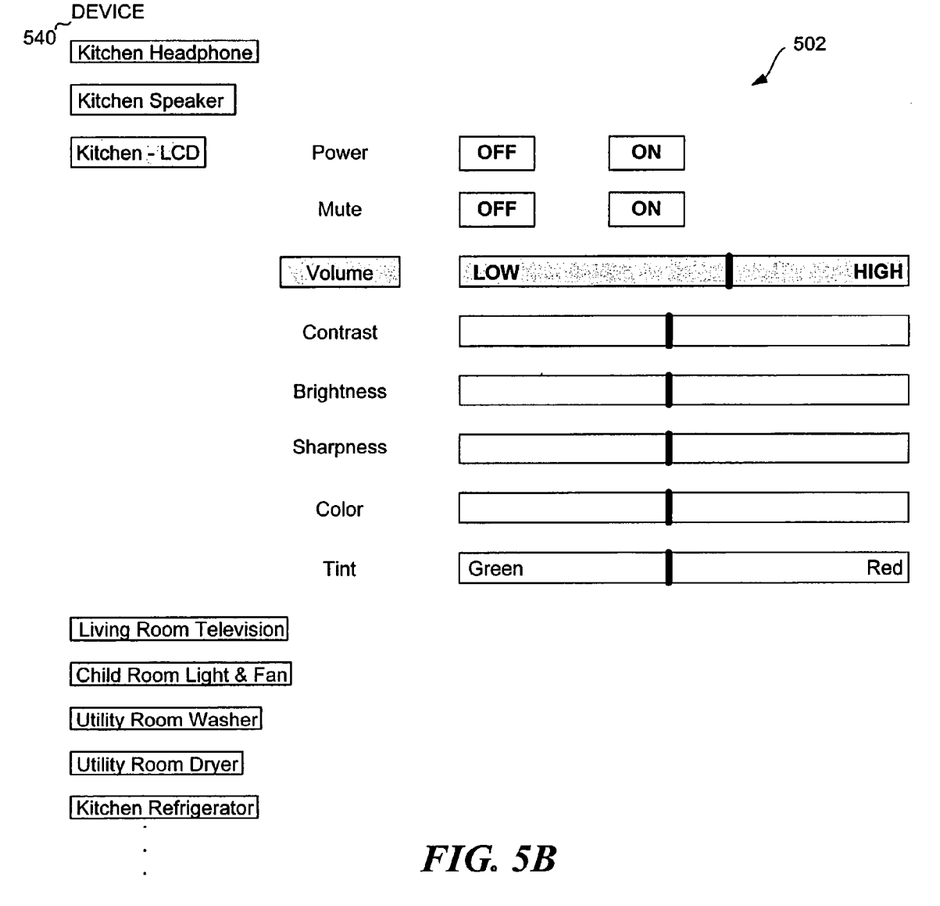
FIG. 5B illustrates an exemplary display of a multicast enabled remote control where the multicast enabled remote control is in a port position that enables control of all multicast devices in the home.

As previously indicated, a separate port, such as, for example, port 1, may be used to send control signals to all of the network devices in the home. In one embodiment, typical controls of a device may be capable of being controlled using multicast enabled remote control 195. In another embodiment, a device manufacturer may turn on the most commonly used control functions for direct control using multicast enabled remote control 195. An example of how a device may be controlled using multicast enabled remote control 195 is shown in FIG. 5B. Display 502 provides a list 540 of all of the network devices. In one embodiment, upon selection of a network device, a list of parameters will appear for controlling a selected device. For example, as shown in FIG. 5B, when "LCD-Kitchen" is selected, the following control parameters may appear: Power, Mute, Volume, Contrast, Brightness, Sharpness, Color, and Tint. The up and down arrows on multicast enabled remote control 195 may be used to select the control that needs to be changed. Once the control has been selected, then the forward and backward arrows on multicast enabled remote control 195 may be maneuvered to set the control. When an enter button is selected, the multicast control signal is sent to the device on the control port, such as, for example, port 1, and the corresponding control is adjusted for the selected network device.

Network devices may also be programmed to operate based on time intervals. For example, all lights in a particular zone of the home may be programmed to turn off at midnight each day. In another example, the heating and cooling system may be automatically set to a cooler temperature during the evening/nighttime hours versus the daytime hours.

A variety of scenarios may be utilized to program devices within the home. For example, a parent may prevent various audio/video streams from being played in the children's room by blocking the input devices in the children's room. Blocking prevents the input devices designated as being blocked from listening to particular multicast addresses. One skilled in the relevant art(s) would know that multicast enabled remote control 195 is capable of performing other standard remote control functions as well.

Figure 6:
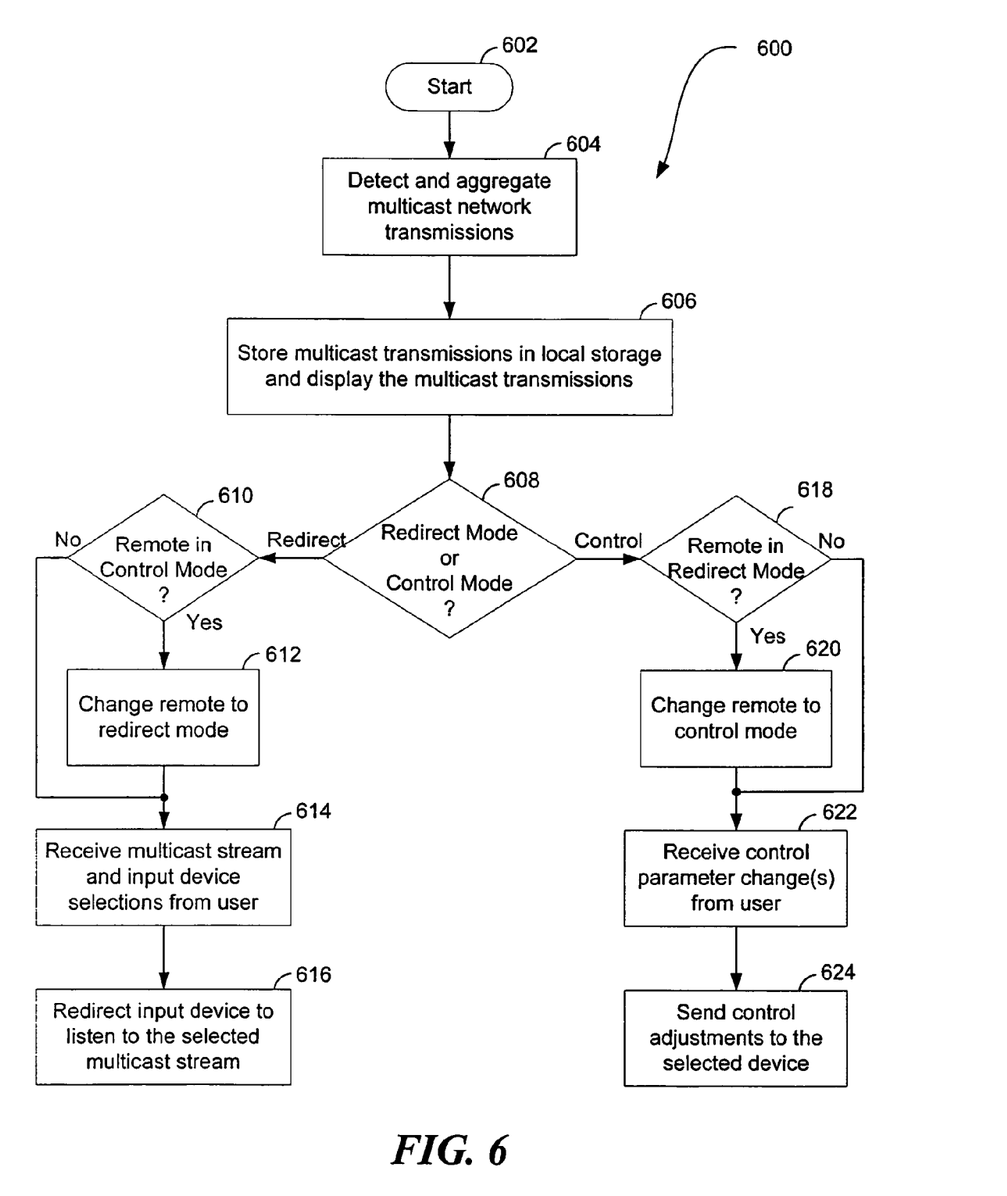
FIG. 6 is a flow diagram describing an exemplary method for controlling a home network using a multicast enabled remote control according to an embodiment of the present invention.

FIG. 6 is a flow diagram 600 describing an exemplary method for controlling a home network using a multicast enabled remote control according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. The process begins with block 602, where the process immediately proceeds to block 604.

In block 604, multicast enabled remote control 195 detects and aggregates all of the multicast network transmissions from the network devices and the home gateway in the home network. As previously indicated, each home network device is given a user friendly name and assigned a fixed multicast address at set up. The user friendly name may be related to the type of device as well as the device location within the home. For example, a camcorder in the child's bedroom may be given the name Child's Room CAM. Each home network device may record its presence by multicasting its identity on the fixed multicast address. The process then proceeds to block 606.

In block 606, multicast enabled remote control 195 stores the multicast network transmissions in a local storage and displays them on display 502. For example, if multicast enabled remote control 195 is set for redirect mode (port 0), display 502 will show data list 504 and input device list 506 (see FIG. 5A). If multicast enabled remote control 195 is set for control mode (port 1), display 502 will show a list of all of the digital network devices in the home capable of being controlled by multicast enabled remote control 195 (see FIG. 5B). The process then proceeds to decision block 608.

In decision block 608, it is determined whether a user of multicast enabled remote control 195 wants to redirect a multicast audio and/or video stream to an input device or control a digital network device within the home. If the user wishes to redirect audio/video streams, the process proceeds to decision block 610.

In decision block 610, it is determined whether multicast enabled remote control 195 is set for control mode. If multicast enabled remote control 195 is set for control mode, the process proceeds to block 612, where the mode is changed to the redirect mode. The process then proceeds to block 614.

Returning to decision block 610, if multicast enabled remote control 195 is set for redirect mode, the process then proceeds to block 614.

In block 614, an audio and/or video multicast stream from data list 504 and an input device from device list 506 is entered. Upon entering the user's selections, the selected input device is redirected to listen to the selected multicast address stream in block 616.

Returning to decision block 608, if it is determined that the user wants to control a device, the process proceeds to decision block 618. In decision block 618, it is determined whether multicast enabled remote control 195 is set for redirect mode. If multicast enabled remote control 195 is set for redirect mode, the process proceeds to block 620, where the mode is changed to the redirect mode. The process then proceeds to block 622.

Returning to decision block 618, if it is determined that multicast enabled remote control 195 is not set for redirect mode, the process then proceeds to block 622.

In block 622, parameter changes for controlling a network device are entered by the user into multicast enabled remote control 195. The user selects the device and the parameters that the user wishes to control and enters the changes as described above. In one embodiment, the user may adjust multiple controls of the device by selecting the parameters and entering the adjustment. In one embodiment, after the user has entered the adjustments/changes, the user may press the Enter button on multicast enabled remote control 195 to enable the changes to take affect. The process then proceeds to block 624.

In block 624, multicast enabled remote control 195 sends the control adjustments to the selected device, wherein the device is adjusted according to the control levels selected by the user.

Certain aspects of embodiments of the present invention may be implemented using hardware, software, or a combination thereof and may be implemented as a multicast enabled remote control in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices for controlling, for example, the digital network home devices described above or for redirecting multicast audio/video streams to selected digital network home input devices as described above. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A system, comprising:
a plurality of network devices communicatively coupled in a local area network capable of receiving and/or transmitting multicast input and/or output signals, wherein the plurality of network devices have local multicast addresses/channels;
a multicast enabled remote device communicatively coupled to the plurality of network devices via the local area network, the remote device to detect, aggregate, store and display audio/video multicast output signals on the multicast enabled remote device, wherein the remote device has a redirect mode and a control mode,
wherein a redirect selection by a user places the remote device in redirect mode and redirects one or more of the plurality of network devices capable of receiving multicast input signals to listen to a selected audio/video multicast output signal from an output device different from the remote device, and
wherein a control selection by the user places the remote device in control mode and sends a control adjustment to the remote device is responsive to another selection by the user to control the one or more of the plurality of home network devices.

2. The system as recited in claim 1, wherein the one or more network devices comprises an image display device, and the signal forwarded comprises one or more images stored on a local storage device.

3. The system as recited in claim 1, wherein the plurality of network devices capable of receiving and/or transmitting multicast input and/or output signals include non audio/video network devices, wherein the non audio/video network devices include home appliances.

4. The system as recited in claim 3, wherein the one or more network devices comprises an printer, and the signal forwarded comprises one or more documents to be printed on the printer.

5. The system as recited in claim 1, wherein each of the plurality of network devices is assigned a local multicast address and a user friendly name for identifying each of the plurality of network devices.

6. A method for controlling network devices comprising:
detecting and aggregating multicast transmissions in a network, by a multicast enabled remote device communicatively coupled to a plurality of network devices via a local area network,
wherein the plurality of network devices have local audio/video multicast addresses/channels;
storing, by the multicast enabled remote device, the multicast transmissions in a local storage;
displaying, based on a mode setting of the multicast enabled remote device, a configuration for the multicast transmissions, wherein if the mode setting of the multicast enabled remote device is in a redirect mode, the display comprising a list of the local audio/video multicast addresses and associated identities for each audio/video multicast address and a list of network input devices capable of playing or utilizing audio/video content on the multicast addresses; wherein a user is enabled to select one or more audio/video multicast addresses and at least one network input device on the multicast enabled remote device to enable viewing or utilization of the selected content on the at least one network input device;
selecting by a user on the remote device, a multicast signal for viewing or playing from an output device different from the remote device;
selecting by the user on the remote device, one of the list of network input devices capable of playing or utilizing the selected multicast signal;
redirecting the selected input device to listen to the selected multicast signal; and
selecting by a user of the remote device a control selection that places the remote device in control mode and sends a control adjustment to the selected input device.

7. The method of claim 6, wherein network devices and signals received from outside of the network are provided a local multicast address and a user friendly name for identification; wherein the network devices and the signals from outside of the network record their presence by multicasting their identities on the provided local multicast addresses.

8. The method of claim 6, wherein the selected network input device comprises an image display device, and further comprising displaying the selected content on the image display device.

9. The method as recited in claim 8, wherein the selected signal comprise images stored in a local storage device communicatively coupled to the network.

10. The method as recited in claim 6, wherein the selected network input device comprises a printer, and further comprising printing the selected signal on the printer.

11. One or more non-transitory machine readable storage medium having instructions stored thereon, the instructions when executed on a processor, cause the processor to:
detect and aggregate multicast transmissions in a network, by a multicast enabled remote device communicatively coupled to a plurality of network devices via a local area network,
wherein the plurality of network devices have local audio/video multicast addresses/channels;
store, by the multicast enabled remote device, the multicast transmissions in a local storage;
display, based on a mode setting of the multicast enabled remote device, a configuration for the multicast transmissions, wherein if the mode setting of the multicast enabled remote device is in a redirect mode, the display comprising a list of the local audio/video multicast addresses and associated identities for each audio/video multicast address and a list of network input devices capable of playing or utilizing audio/video content on the multicast addresses; wherein a user is enabled to select one or more audio/video multicast addresses and at least one network input device on the multicast enabled remote device to enable viewing or utilization of the selected content on the at least one network input device;
responsive to selection, by a user using the remote device, of a multicast signal for viewing or playing from an output device different from the remote device and one of the list of network input devices capable of playing or utilizing the selected multicast signal, redirect the selected input device to listen to the selected multicast signal; and
responsive to selection, by the user using the remote device, of a control selection, place the remote device in control mode and send a control adjustment to the selected input device.

12. The media of claim 11, wherein network devices and signals received from outside of the network are provided a local multicast address and a user friendly name for identification; wherein the network devices and the signals from outside of the network record their presence by multicasting their identities on the provided local multicast addresses.

13. The media of claim 11, wherein the selected network input device comprises an image display device, and further comprising instructions to display the selected content on the image display device.

14. The media as recited in claim 13, wherein the selected signal comprise images stored in a local storage device communicatively coupled to the network.

15. The media as recited in claim 11, wherein the selected network input device comprises a printer, and further comprising instructions to print the selected signal on the printer.

* * * * *